Oct. 1, 1957  D. RAGLAND  2,808,134
FLUID-COOLED BRAKING DEVICE
Filed Sept. 14, 1955

INVENTOR.
Douglas Ragland
BY
John J. Schneider
ATTORNEY.

2,808,134

FLUID-COOLED BRAKING DEVICE

Douglas Ragland, Houston, Tex., assignor, by mesne assignments, to Esso Research and Engineering Company, Elizabeth, N. J., a corporation of Delaware Application September 14, 1955, Serial No. 534,302

9 Claims. (Cl. 188—264)

This invention is directed to a fluid-cooled brake rim adapted for use with apparatus such as hoists or drawworks. More particularly, this invention is directed to a water-cooled sectional braking rim wherein each of the rim sections is adapted to be separately assembled and disassembled.

Briefly, the invention comprises a rotatable inner drum flange, a plurality of arcuate brake rim sections rotatably secured to this flange and arranged to form a continuous cylindrical brake rim and an outer flange rotatably secured to the rim sections. Each of the rim sections contains a water chamber and means are provided for circulating water through the chambers to cool the brake rim.

Present brake rims employed on hoists, drawworks, or similar apparatus, are made in one piece, which requires that the drum shaft be removed from the drawworks assembly in order for the one-piece rims to be unbolted and removed whenever replacement is desired. This invention obviates removing the drum shaft assembly from such apparatus, when changing brake rims by forming the brake rim in sections, each section being separately removable and separately replaceable. Cooling means are provided by forming a water chamber in each of the rim sections and fluidly intercommunicating each of the chambers whereby water may be successively circulated through each of the chambers.

Referring to the drawings.

Figure 1:
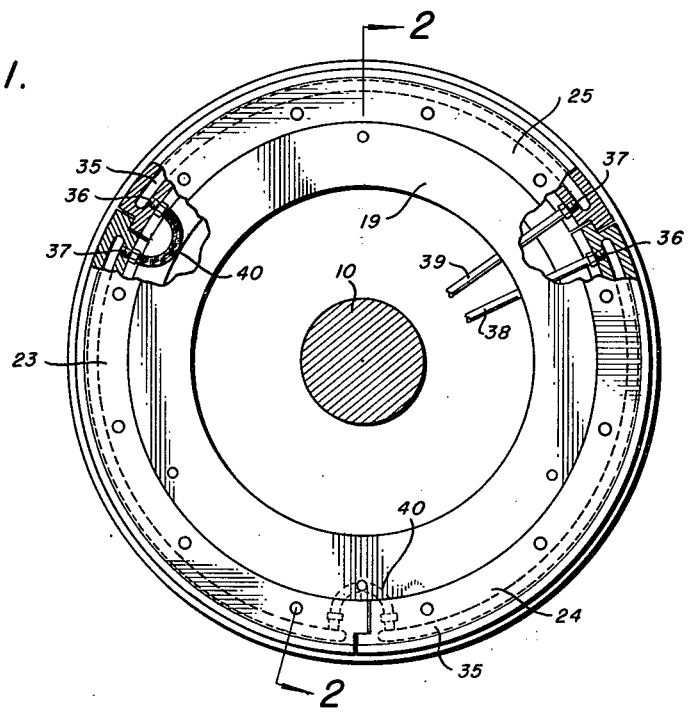
Fig. 1 is a sectional view taken on lines 1—1 of Fig. 2.
Figure 2:
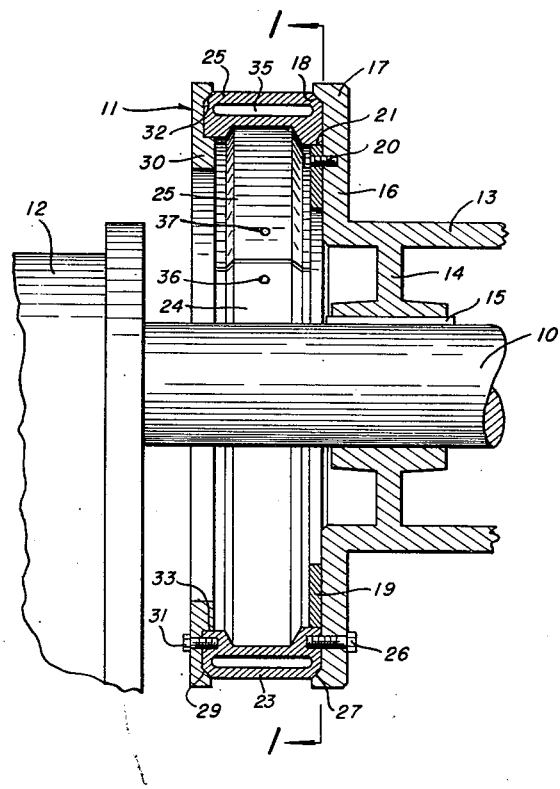
Fig. 2 is a sectional view taken on lines 2—2 of Fig. 1 and showing schematically the drive shaft and associated shaft support bearing housing.

Referring to the drawings in greater detail, wherein identical numerals designate identical parts, Figs. 1 and 2 disclose a drive shaft 10 extending through a brake rim assembly generally designated 11 and into a supporting bearing housing shown schematically at 12. A drum shaft 13 is secured for rotation with drive shaft 10 by means of struts 14, keyed as at 15, to drive shaft 10. Integral with drum shaft 13 is a drum flange 16 provided with an annular lip 17. The lip 17 is provided with a beveled annular supporting ledge 18. A cylindrical backup plate 19 is secured to drum flange 16 by means of cap screw 20. The outer periphery 21 of the backup plate is spaced radially inwardly from the lip 17 of the drum flange 16.

A plurality of arcuate brake rim sections 23—25 are fittingly connected to the drum flange 16 by means of cap screws 26. These sections, as more clearly seen in Fig. 2, are arranged to form a continuous cylindrical surface. Brake rim sections 23—25 are provided with axially inner beveled surfaces 27 which engage with supporting ledge 18 of the drum flange 16. The distance, radially, between the periphery 21 of backup plate 19 and the lip 17 of drum flange 16 is slightly less than the thickness of the brake rim sections 25, in order to provide a deformation fit to adequately support radially inwardly acting brake loads and radially outwardly acting centrifugal loads. Brake rim sections 23—25 are also provided with axially outer annular surfaces 29.

An axially outer cylindrical flange 30 is secured to brake rim sections 25 by means of cap screws 31. Flange 30 is provided with a supporting ledge 32 which engages outer surfaces 29 of brake rim sections 23—25. Also, flange 30 is provided with an axially extending shoulder portion 33 which engages the radially inner surfaces of brake rim sections 23—25.

Each of the brake rim sections is provided with a fluid chamber 35. These chambers, as more clearly shown in Fig. 1, are provided with fluid inlet and fluid discharge passages 36 and 37, respectively. One of the inlet passages 36, for example, the one located in rim section 24, is connected to a cooling fluid source, not shown, through conduit 38. This fluid source may suitably be a cooling water circulator. A cooling fluid outlet conduit 39 is connected to the fluid discharge passage 37 in the brake rim section 25 adjacent to the cooling fluid inlet passage 36 in brake rim section 24. The remaining fluid inlet and fluid discharge passages 36 and 37 in adjacent brake rim sections are fluidly interconnected by means of a hose 40, which may be flexible or rigid.

In assembly, the backup plate 19 is secured to the drum flange 16 by means of cap screws 20. Then the individual brake rim sections 25 are secured between the outer periphery of the backup plate and the lip 17 of drum flange 16 by means of cap screws 26. The axially outer flange 30 is then secured to the individual rim sections 25 by means of cap screws 31. Conduits 40 are connected to the adjacent inlet and discharge passages 36 and 37 in rim sections 24, 23 and 23, 25, respectively, and cooling fluid inlet and outlet conduits 38 and 39 are secured to the inlet and outlet passages 36 and 37 in rim sections 24 and 25, respectively, as shown in Fig. 1.

As can more readily be seen in Fig. 2, to remove and replace brake rim sections 23, 24 and 25 it is only necessary to remove cap screws 31, move outer flange 30 away from the brake rim sections 23, 24 and 25, and remove cap screws 26 securing the brake rim sections 23—25 to the drum flange 16. The brake rim sections 23—25 may then be removed from the apparatus without disassembling the drum shaft and drive shaft. If the brake rim had been made in one piece, removal of the rim would have required displacing the drive shaft from the bearing housing 12 and either removing the drive shaft 10 from the housing or moving the rim in an axial direction from over the end of drive shaft 10 after disassembling and removing the bearing housing. In either case considerable time and effort must be expended. This invention eliminates these difficulties and provides a rapid means for replacing brake rims.

Having described the objects, construction and operation of my invention, I claim as my invention:

1. A water-cooled braking device for drawworks comprising a rotatable inner drum flange provided with an annular lip, a first supporting ledge on said lip, a cylindrical backup plate secured to said drum flange, the outer periphery of said plate being inwardly radially spaced from said lip, a plurality of arcuate brake rim sections removably secured to said drum flange and fittingly arranged to form a continuous cylindrical rim, inner and outer annular beveled surfaces on each of said rim sections, an annular outer flange having a second supporting ledge thereon and removably secured to said rim sections, said inner annular surfaces being engageable with said first supporting ledge and said outer annular surfaces being engageable with said second supporting ledge, a water chamber in each of said rim sections provided with water inlet and discharge passages, a water supply conduit connected to one of said inlet passages, a water discharge conduit connected to one of said outlet passages and conduits connecting respectively said remaining inlet and discharge passages of adjacent rim sections whereby water is circulated successively through each of said chambers.

2. A fluid-cooled braking device for drawworks comprising a rotatable inner drum flange provided with an annular lip, a first supporting ledge on said lip, a cylindrical backup plate secured to said drum flange, the outer periphery of said plate being inwardly radially spaced from said lip, a plurality of arcuate brake rim sections removably secured to said drum flange and fittingly arranged to form a continuous cylindrical rim, inner and outer annular beveled surfaces on each of said rim sections, an annular outer flange having a second supporting ledge thereon and removably secured to said rim sections, said inner annular surfaces being engageable with said first supporting ledge, and said outer annular surfaces being engageable with said second supporting ledge, a fluid chamber in each of said rim sections, and means for circulating fluid through said chambers to cool said brake rim.

3. A braking device for drawworks comprising a rotatable inner drum flange provided with an annular lip, a first supporting ledge on said lip, a cylindrical backup plate secured to said drum flange, the outer periphery of said plate being inwardly radially spaced from said lip, a plurality of arcuate brake rim sections removably secured to said drum flange and fittingly arranged to form a continuous cylindrical rim, inner and outer annular beveled surfaces on each of said rim sections, an annular outer flange having a second supporting ledge thereon removably secured to said rim sections, said inner annular surfaces being engageable with said first supporting ledge, and said outer annular surfaces being engageable with said second supporting ledge.

4. A braking device comprising a rotatable inner flange provided with a first supporting ledge, a plurality of arcuate brake rim sections removably secured to said inner flange and arranged to form a continuous cylindrical rim, inner and outer annular beveled surfaces on said rim sections, an outer flange provided with a second supporting ledge removably secured to said rim sections, said inner and outer annular rim surfaces being engageable with said first and second supporting ledges, respectively, and backup means secured to said inner flange adapted to support and retain said rim sections on said inner flange.

5. A fluid-cooled braking device comprising a rotatable inner flange provided with a first supporting ledge, a plurality of arcuate brake rim sections removably secured to said inner flange and arranged to form a continuous cylindrical rim, inner and outer annular beveled surfaces on said rim sections, an outer flange provided with a second supporting ledge removably secured to said rim sections, said inner and outer annular rim surfaces being engageable with said first and second supporting ledges, respectively, backup means secured to said inner flange adapted to support and retain said rim sections on said inner flange, a fluid chamber in each of said rim sections provided with fluid inlet and discharge passages, a fluid supply conduit connected to one of said inlet passages, a fluid discharge conduit connecting to one of said outlet passages, and a plurality of conduits connecting respectively said remaining inlet and discharge passages of adjacent rim sections whereby fluid is circulated successively through each of said chambers.

6. A braking device comprising a rotatable inner flange provided with a first supporting ledge, a plurality of arcuate brake rim sections removably secured to said inner flange and arranged to form a continuous cylindrical rim, inner and outer annular beveled surfaces on said rim sections, an outer flange provided with a second supporting ledge removably secured to said rim sections, said inner and outer annular rim surfaces being engageable with said first and second supporting ledges, respectively, backup means secured to said inner flange adapted to support and retain said rim sections on said inner flange, a fluid chamber in each of said rim sections and means for circulating fluid through said chambers to cool said brake rim.

7. A braking device adapted for use with a drawworks comprising a rotatable inner flange, a plurality of arcuate rim sections removably secured to said inner flange and arranged to form a continuous cylindrical brake rim, an outer flange removably secured to said rim sections, and means positioned radially inwardly and outwardly on said inner and outer flanges adapted to support and retain said rim sections.

8. A braking device adapted for use with a drawworks comprising a rotatable inner flange, a plurality of arcuate rim sections removably secured to said inner flange and arranged to form a continuous cylindrical brake rim, an outer flange removably secured to said rim sections, means positioned radially inwardly and outwardly on said inner and outer flanges adapted to support and retain said rim sections, a fluid chamber in each of said rim sections provided with fluid inlet and discharge passages, a fluid supply conduit connecting to one of said inlet passages, a fluid discharge conduit connected to one of said outlet passages, and circulating conduits connecting respectively said remaining inlet and discharge passsages of adjacent rim sections whereby fluid is circulated successively through each of said chambers.

9. A braking device adapted for use with a drawworks comprising a rotatable inner flange, a plurality of arcuate rim sections removably secured to said inner flange and arranged to form a continuous cylindrical brake rim, an outer flange removably secured to said rim sections, means positioned radially inwardly and outwardly on said inner and outer flanges adapted to support and retain said rim sections, a fluid chamber in each of said rim sections, and means for circulating fluid through said chambers to cool said brake rim.

References Cited in the file of this patent

UNITED STATES PATENTS

| | | |
|---|---|---|
| 1,853,118 | Faulkner | Apr. 12, 1932 |
| 1,918,501 | Spalding | July 18, 1933 |
| 2,008,633 | Yount | July 16, 1935 |